(12) United States Patent
Wendland et al.

(10) Patent No.: US 7,252,560 B2
(45) Date of Patent: Aug. 7, 2007

(54) CRIMPED CENTER CONDUCTOR

(75) Inventors: Randall Wendland, Cologne, MN (US); Jeffrey Kes, Jordan, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 11/260,502

(22) Filed: Oct. 27, 2005

(65) Prior Publication Data

US 2007/0099521 A1 May 3, 2007

(51) Int. Cl.
*H01R 11/22* (2006.01)
(52) U.S. Cl. ..................................... 439/851
(58) Field of Classification Search ............... 439/851; 29/874
See application file for complete search history.

(56) References Cited

U.S. PATENT DOCUMENTS

| | | | |
|---|---|---|---|
| 3,040,288 A | 6/1962 | Edlen et al. | |
| 3,099,510 A * | 7/1963 | Piorunneck | 439/851 |
| 3,381,261 A * | 4/1968 | Deakin | 439/787 |
| 3,786,558 A * | 1/1974 | McCarthy | 29/874 |
| 4,304,457 A * | 12/1981 | Lissau | 439/851 |
| 4,447,108 A * | 5/1984 | Ghigliotti et al. | 439/851 |
| 4,550,972 A * | 11/1985 | Romak | 439/839 |
| 5,116,266 A * | 5/1992 | Seymour et al. | 439/851 |
| 5,254,022 A * | 10/1993 | Stuart | 439/877 |
| 5,413,494 A | 5/1995 | Dewey et al. | |
| 5,417,588 A | 5/1995 | Olson et al. | |
| 5,467,062 A | 11/1995 | Burroughs | |
| 6,045,415 A | 4/2000 | May et al. | |
| 6,551,136 B2 | 4/2003 | Johnsen et al. | |

FOREIGN PATENT DOCUMENTS

GB 993316 5/1965
GB 2 054 281 A 2/1981

* cited by examiner

*Primary Examiner*—Neil Abrams
(74) *Attorney, Agent, or Firm*—Merchant & Gould P.C.

(57) ABSTRACT

A center conductor for use in a coax jack module assembly, for example. The center conductor including a conductive body having a crimped region and an uninterrupted region. The crimped region being located only within one of a first half and a second half of the conductive body. The first half and the second half of the conductive body being defined by a plane, which is defined by a central axis of the conductive body. The crimped region is defined by slots, such as saw cuts, made at an angle parallel to the plane.

32 Claims, 11 Drawing Sheets

CRIMPED CENTER CONDUCTOR

TECHNICAL FIELD

This disclosure relates generally to devices used in the telecommunications industry, and associated methods of making such devices. In particular, this disclosure relates to center conductors used in coax jack modules.

BACKGROUND

The telecommunications industry has central offices or locations that utilize a substantial number of coax jack modules. The coax jack modules are used to provide cross-connect functions, line monitoring, and line access of high-speed signals carried over coaxial cables.

A coax jack module generally includes a housing that carries one or more internal switching assemblies. Each of the switching assemblies receives a jack plug through a jack port formed in a housing. The internal switch assemblies are interconnected to coax connectors located on the housing opposite the jack ports. The coax connectors are in turn attached to coaxial cables carrying the high-speed signals. In use, jack plugs are inserted into the jack ports to provide cross-connect, line monitoring, and line access functions. The jack plugs each include a pin element that is received by a center conductor of the switching assemblies. Further details of an example coax jack module are provided in U.S. Pat. No. 5,467,062, the disclosure of which is incorporated herein by reference.

Figure 1:
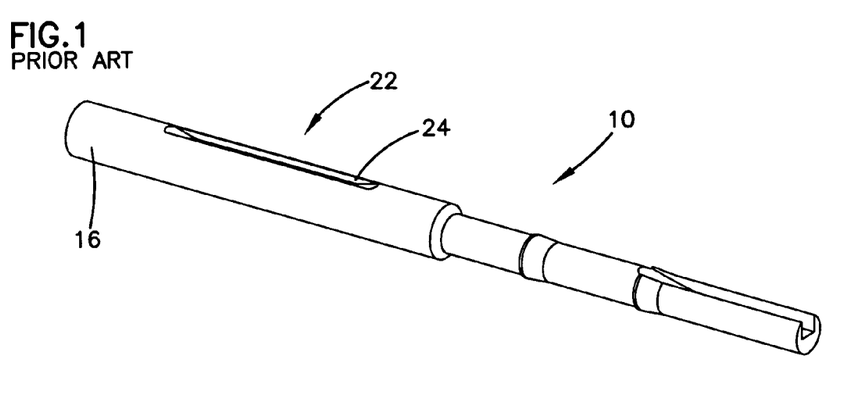
FIG. 1 is a perspective view of a prior art center conductor having two 180-degree opposed slots, shown prior to forming a crimped contact portion.
Figure 2:
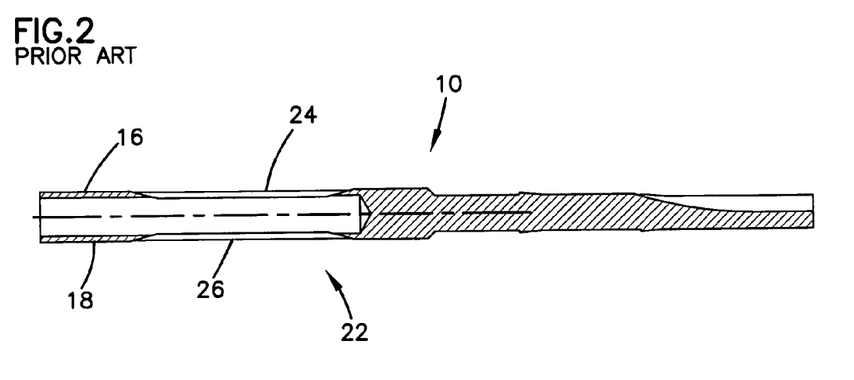
FIG. 2 is a cross-sectional view of the prior art center conductor of FIG. 1.
Figure 3:
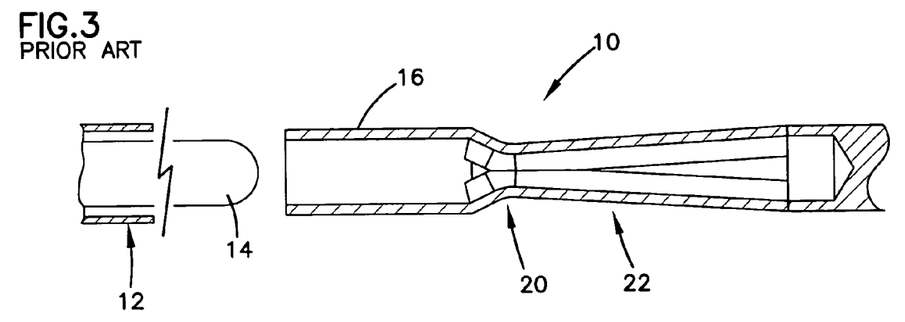
FIG. 3 is a partial, cross-sectional view of the prior art center conductor of FIG. 1, shown after forming the crimped contact portion.

FIGS. 1-3 illustrate one conventional center conductor 10 that can be used in a switching assembly of a coax jack module. During use, a jack plug 12 (partially shown in FIG. 3) is inserted into a jack port of the coax jack module such that a pin element 14 of the jack plug 12 is received within an end 16 of the center conductor 10.

The end 16 of the center conductor 10 has a generally tubular construction 18 that receives the pin element 14 of the jack plug 12. The tubular construction 18 includes a crimped contact portion 20 (FIG. 3) that ensures proper contact between the center conductor 10 and the pin element 14 of the jack plug 12. (FIGS. 1 and 2 illustrate the center conductor 10 prior to formation of the crimped contact portion 20.) The crimped contact portion 20 is located in a region 22 at which two opposing slots 24, 26 are located. The opposing slots 24, 26 are positioned 180 degrees from one another. The slots 24, 26 accommodate crimping of the tubular construction 18 (i.e. the inward displacement of material), and permit the crimped contact portion 20 to expand when a pin element is inserted into the center conductor. That is, the crimped contact portion 20 functions as a spring beam for mechanical connection to the pin element 14 of the jack plug 12. The contact portion 20 is crimped about the entire circumference (360 degrees) of the tubular construction 18.

Conventional center conductor arrangements have experienced problematic mechanical failure and premature fatigue at the crimped contact portion of the conductor. In general, improvement has been sought with respect to such conductor designs, generally to improve upon component reliability and the extended life cycle of a center conductor, while still ensuring proper electrical contact with a pin element of a jack plug.

SUMMARY

One aspect of the present disclosure relates to center conductors having a crimped region. The crimped region includes a contact member that ensures contact between the center conductor and a pin element inserted into the center conductor. The crimped region is located in a one of two halves of the conductive body. Other aspects of the present disclosure relate to a coax jack components including the disclosed center conductors and a method of making the disclosed center conductors.

A variety of examples of desirable product features or methods are set forth in part in the description that follows, and in part will be apparent from the description, or may be learned by practicing various aspects of the disclosure. The aspects of the disclosure may relate to individual features as well as combinations of features. It is to be understood that both the foregoing general description and the following detailed description are explanatory only, and are not restrictive of the claimed invention.

DETAILED DESCRIPTION

Reference will now be made in detail to various features of the present disclosure that are illustrated in the accompanying drawings. Wherever possible, the same reference numbers will be used throughout the drawings to refer to the same or like parts.

Figure 4:
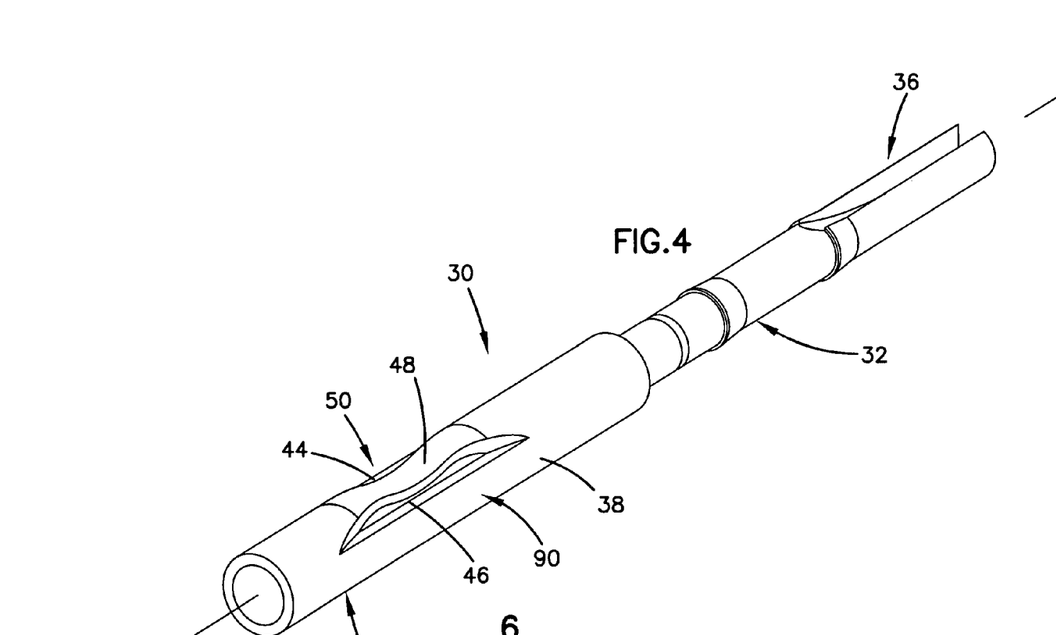
FIG. 4 is a perspective view of one embodiment of a center conductor having a crimped region configured in accordance with the principles disclosed.

FIG. 4 illustrates one embodiment of center conductor 30 with a crimped region 50 having features that are examples of how inventive aspects in accordance with the principles of the present disclosure may be practiced. Preferred features are adapted for improving structural reliability and life cycle use of the center conductor, while ensuring proper electrical contact with pin elements of jack plugs.

Figure 5:
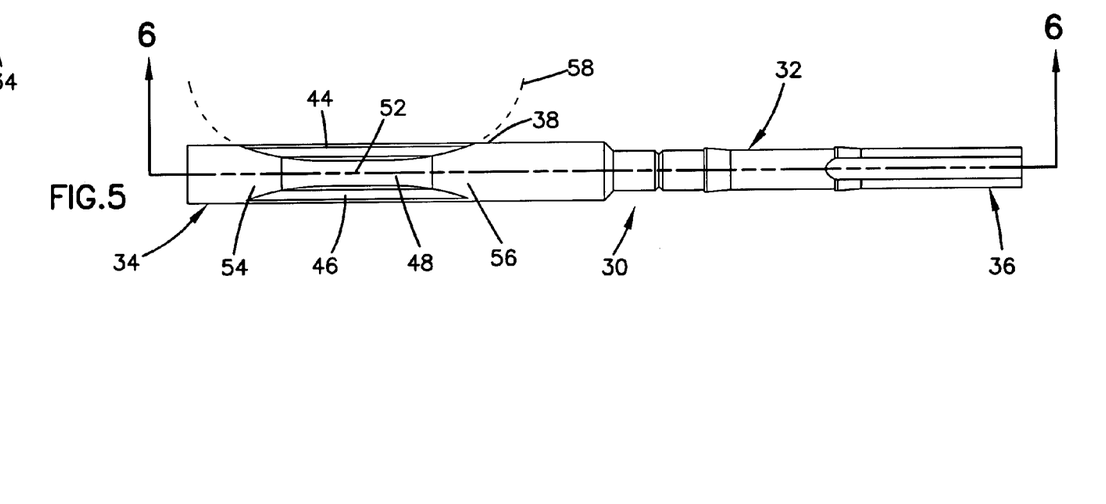
FIG. 5 is a top plan view of the center conductor of FIG. 4.

Referring to FIGS. 4 and 5, the center conductor 30 includes a conductive body 32 having a first end 34 and a second end 36. The conductive body 32 includes a tubular structure 38 located at the first end 34. The tubular structure 38 defines an inner diameter D1 (FIG. 6) sized for receipt of a pin element (e.g. 14 in FIG. 3) of a jack plug. In the illustrated embodiment, the inner diameter D1 of the tubular structure 38 is generally between about 0.030 and 0.034 inches; more preferably about 0.032 inches.

Figure 6:
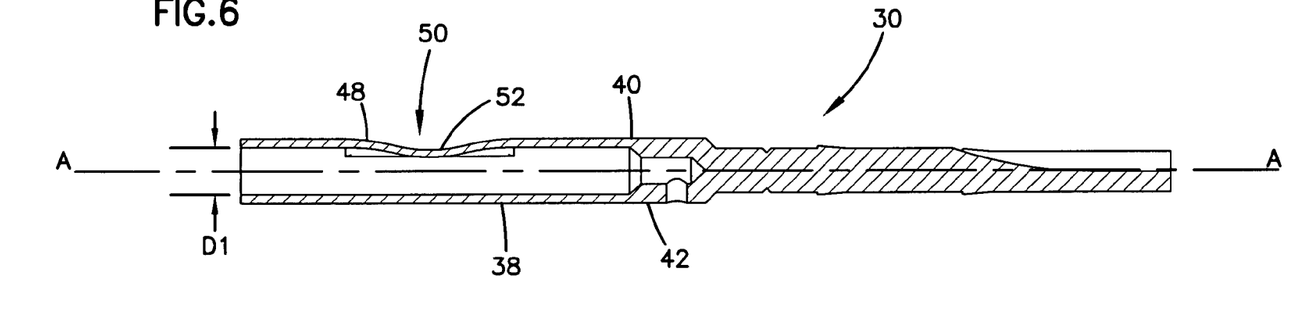
FIG. 6 is a cross-sectional view of the center conductor of FIG. 5, taken along line 6-6.
Figure 7:
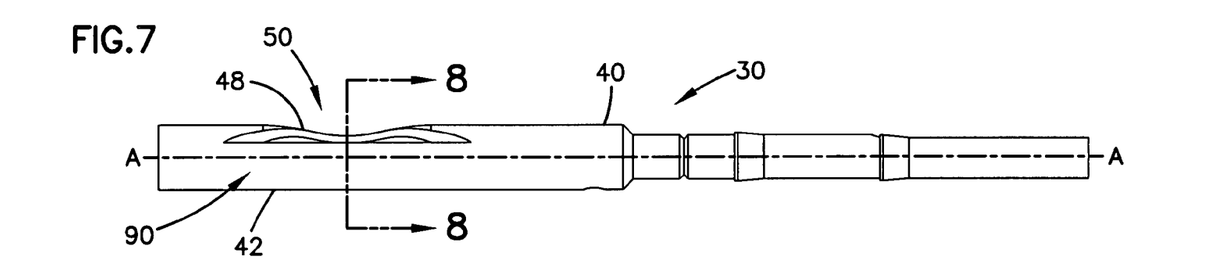
FIG. 7 is a side elevation view of the center conductor of FIG. 4.
Figure 8:
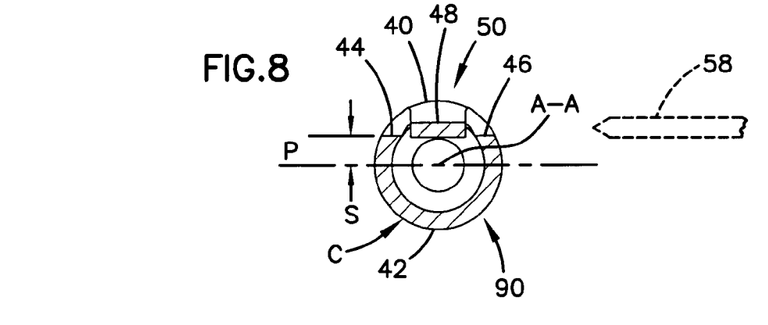
FIG. 8 is a cross-sectional view of the center conductor of FIG. 7, taken along line 8-8.

The conductive body 32 of the center conductor 30 defines a central, longitudinal axis A-A. The longitudinal axis A-A is generally concentric with the inner diameter D1 of the tubular structure 38. As shown in FIGS. 6 and 8, the longitudinal axis A-A defines a plane P that bisects the conductive body 32 to define a first body half 40 and a second body half 42.

The crimped region 50 of the center conductor 30 is located in only one of the either the first body half 40 or the second body half 42. What is meant by crimped region is the region at which material is radially displaced, generally toward the center or longitudinal axis A-A of the center conductor. In the illustrated embodiment, the crimped region 50 is located only within the first body half 40 of the center conductor 30.

Referring back to FIGS. 4 and 5, the crimped region includes first and second elongated slots 44, 46 formed in the tubular structure 38 of the center conductor 30. Other numbers of slots 44, 46 can be provided in accordance with the principle disclosed. The elongated slots 44, 46 extend parallel with the longitudinal axis A-A of the center conductor 30. Preferably, the elongated slots 44, 46 are provided only in the first half 40 of the center conductor 30. In particular, the elongated slots 44, 46 are located a distance S (FIG. 8) from the plane P that bisects the center conductor 30. In the illustrated embodiment, the slots 44, 46 are located to provide an uninterrupted tubular region 90 of approximately 270 degrees (a region equal to approximately 75% of the diameter of the tubular structure 38). The uninterrupted tubular region 90 increases the structural stability and strength of the tubular structure 38 and thereby improves the mechanical reliability of the center conductor 30.

Referring still to FIGS. 4 and 5, the first and second elongated slots 44, 46 define a contact member or contact portion 48. The contact member 48 is the portion of the conductive body 38 that lies between the first and second slots 44, 46 formed in the first half 40 of the conductive body 38. As shown in FIG. 6, the contact member 48 is crimped so that at least a central portion 52 of the contact member 48 radially projects into the inner diameter D1 of the tubular structure 38 of the center conductor 30. The crimped contact member 48 functions as a spring member that ensures proper electrical connection between a pin element of a jack plug and the center conductor.

Referring again to FIG. 5, the contact member 48 at the crimped region 50 of the center conductor includes first and second ends 54, 56 integrally connected to the conductive body 32 of the center conductor 30. The first and second ends 54, 56 are wider than the central portion 52 of the contact member 48. In particular, the first and second ends narrow or taper toward the center portion 52 of the contact member 48. The wider first and second ends 54, 56 increase the structural strength of the contact member 48 at the ends 54, 56 to prevent the contact member 48 from crushing or tearing during insertion of a pin element.

The hourglass shape or tapered configuration of the contact member 48, as shown in FIG. 5, is provided via the manufacturing of the first and second elongated slots 44,46. In particular, the first and second elongated slots 44, 46 are formed by saw cuts. As shown in FIGS. 5 and 8, the saw cuts are provided by a saw blade 58 oriented at an angle parallel to the plane P that bisects the conductive body 32. Accordingly, as shown in FIG. 8, the saw cuts or slots 44, 46 are formed at an angle parallel to the plane P, as opposed to being radially formed or formed perpendicular to the longitudinal axis A-A of the center conductor. As can be seen in FIG. 5, orienting the saw blade 58 parallel to the plane P provides the tapered or narrowing configuration of the contact member 48.

After the contact member 48 is formed, the contact member is crimped such that the central portion 52 projects into the inner diameter D1 of the center conductor, as previously described. In the illustrated embodiment, only the contact member 48 is crimped. Crimping only the contact member 48 contributes to the un-interruption of the tubular region 90.

Referring to FIG. 8, the tubular region 90 and the crimped region 50 of the center conductor 30 define a circumference C of the conductive body 32. The crimped region 50 is located about a portion of the circumference C of the conductive body 32; a remaining portion (i.e. 90) of the circumference C is the uninterrupted portion. The uninterrupted region 90 is non-slotted and un-crimped. By preserving the structural integrity of the region 90 (the region 90 being preferably equal to greater than 50%, more preferably approximately 75% of the diameter of the tubular structure 38), the overall rigidity and strength of the center conductor increases in comparison to conventional conductors. It is believed that the disclosed design of the center conductor 30 provides a 25-30% increase in strength over the conventional center conductor disclosed in FIGS. 1-3.

Figure 9:
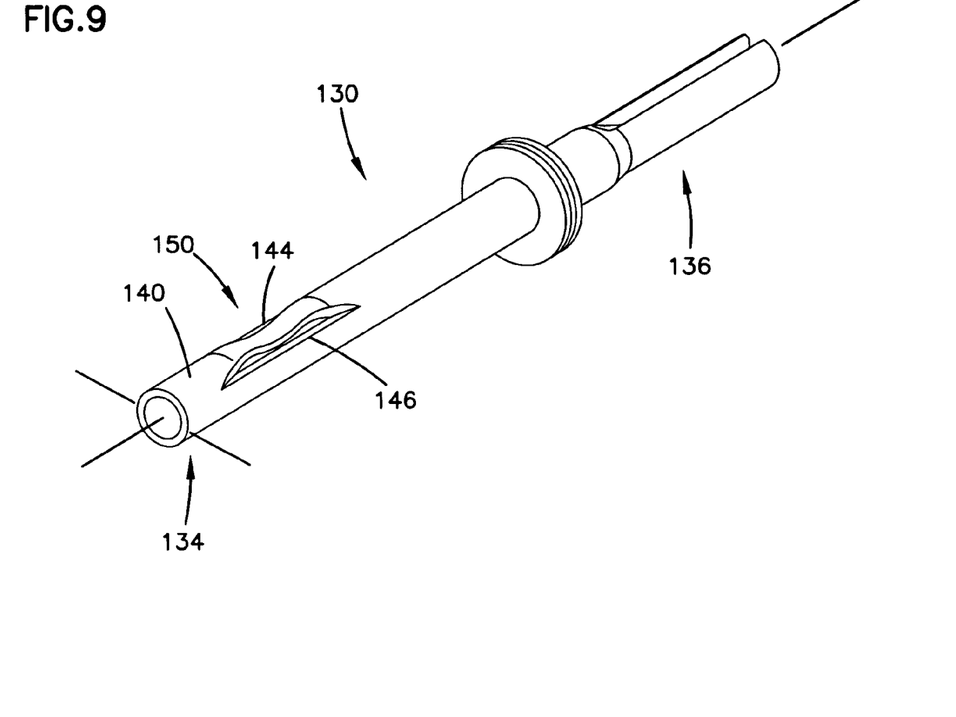
FIG. 9 is an alternative embodiment of a center conductor having a crimped region configured in accordance with the principles disclosed.

Referring now to FIG. 9, an alternative embodiment of a center conductor 130 having first and second ends 134, 136 is illustrated. Similar to the previous embodiment, the center conductor 130 includes a crimped region 150 located at the first end 134. The crimped region 150 includes first and second elongated slots 144, 146 formed only in a first body half 140 of a conductive body 132. The second end 136 of the illustrated center conductor 130 is configured to use in a different module application than that of the first embodiment, as will be described in greater detail hereinafter.

Figure 10:
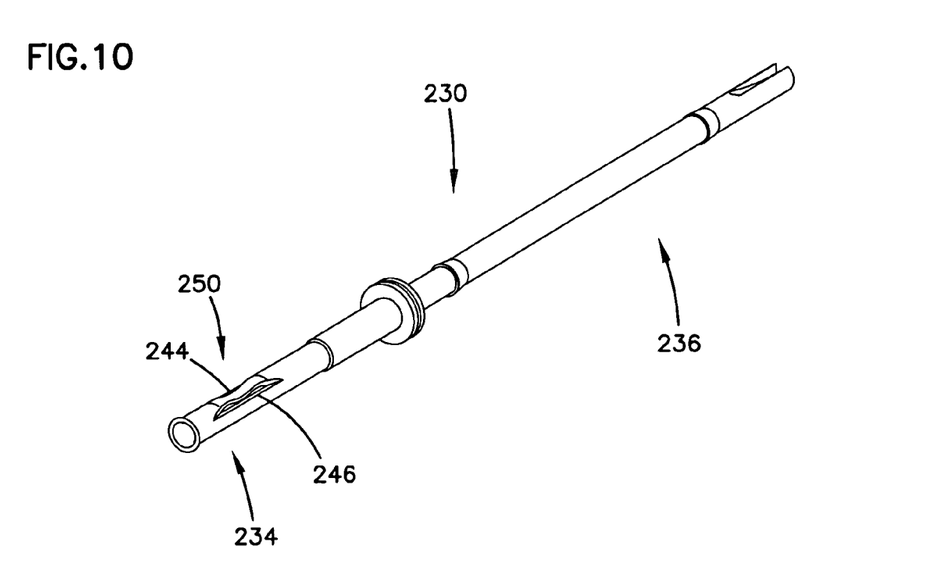
FIG. 10 is yet another alternative embodiment of a center conductor having a crimped region configured in accordance with the principles disclosed.
Figure 11:
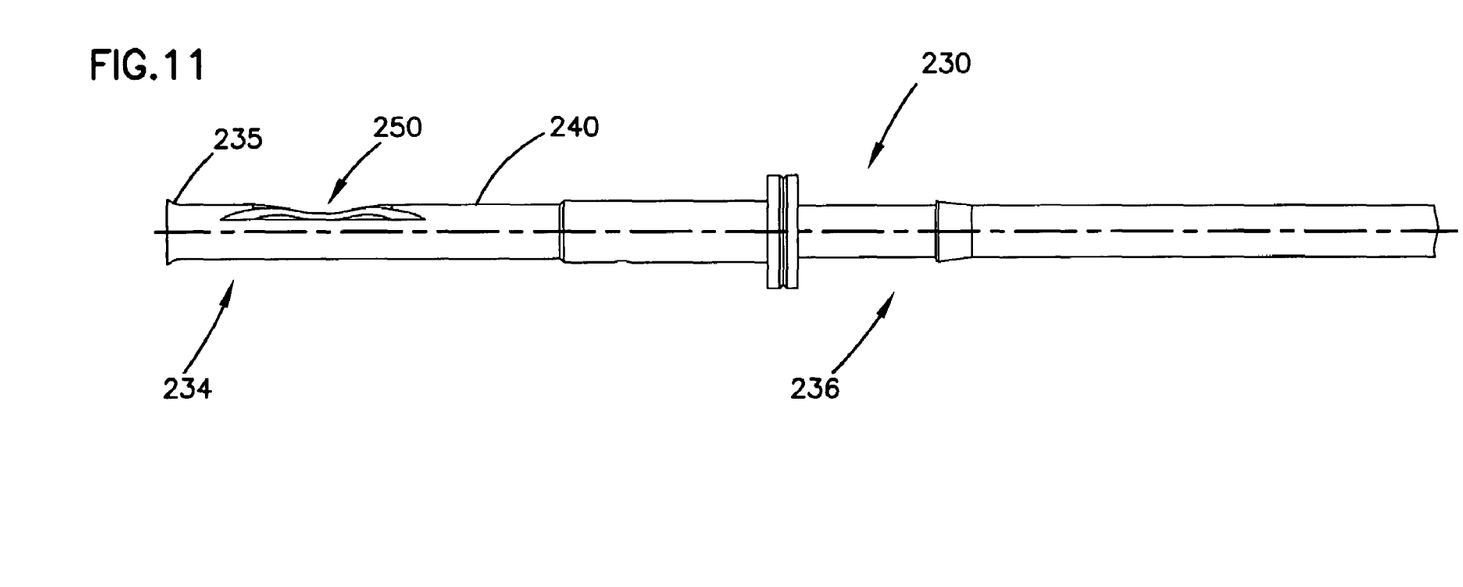
FIG. 11 is a side elevation view of the center conductor of FIG. 10.

Referring to FIG. 10, yet another alternative embodiment of a center conductor 230 having first and second ends 234, 236 is illustrated. Similar to the previous embodiments, the center conductor 230 includes a crimped region 250 located at the first end 234. The crimped region 250 includes first and second elongated slots 244, 246 formed only in a first body half 240 (FIG. 11) of a conductive body 232. The second end 236 of the illustrated center conductor 230 is configured to use in a different module application than that of the previous embodiments, as will be described in greater detail hereinafter. Referring to FIG. 11, the first end 234 of the center conductor 230 is a flared end 235. The flared end 235 aids a user in guiding a pin element of a jack plug into the inner diameter (e.g., D1 in FIG. 6) of the center conductor 230.

Figures 17, 18:
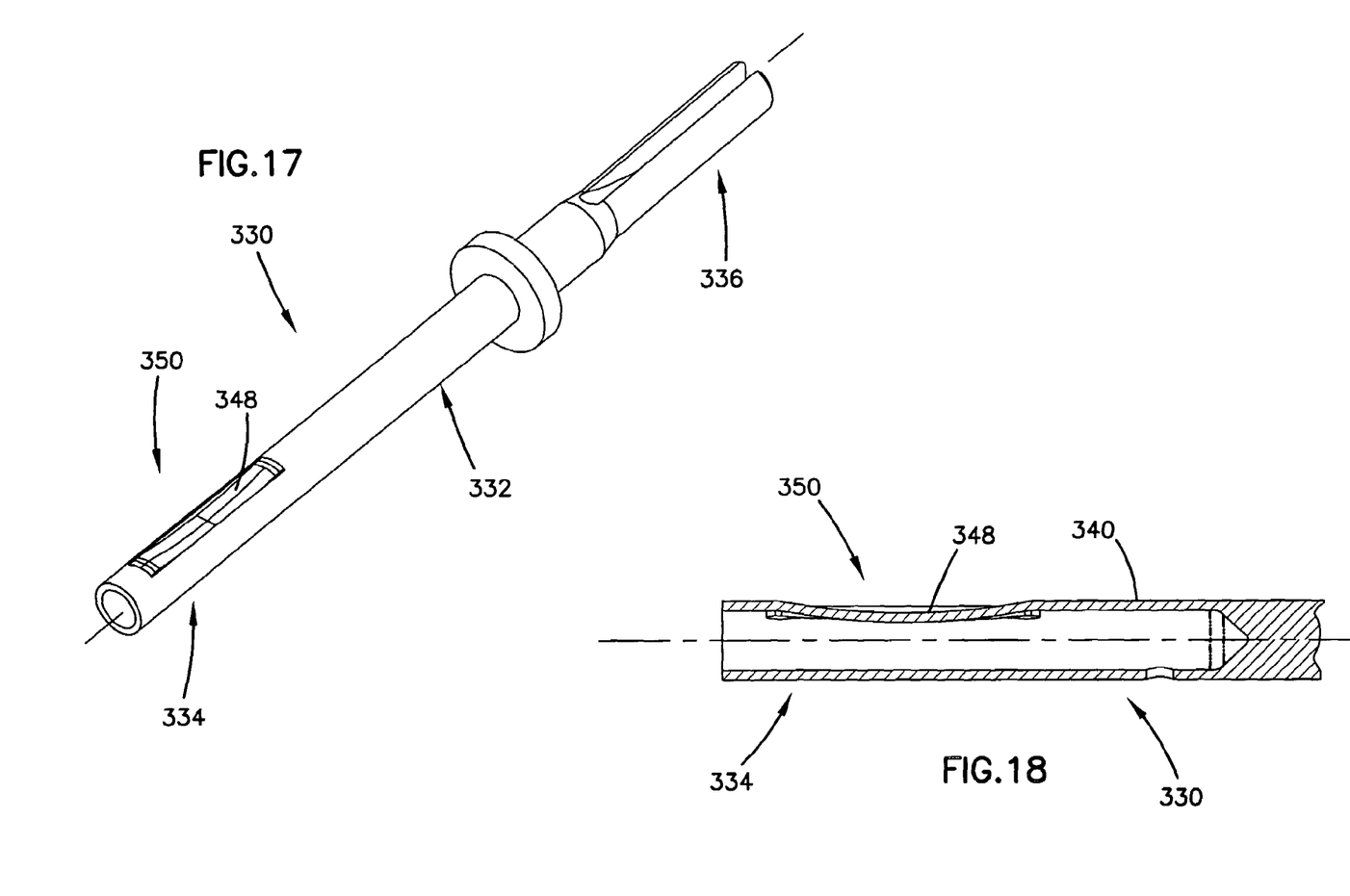
FIG. 17 is a perspective view of still another embodiment of a center conductor having a crimped region configured in accordance with the principles disclosed.
FIG. 18 is a partial, cross-sectional view of the center conductor of FIG. 17.

Referring now to FIGS. 17 and 18, still another alternative embodiment of a center conductor 330 having first and second ends 334, 336 is illustrated. Similar to the previous embodiments, the center conductor 330 includes a crimped region 350 located at the first end 334 of the center conductor 330. In this embodiment, however, the crimped region 350 does not include elongated slots formed in a conductive body 332. Rather, the crimped region 350 is formed by a lancing or punching operation that essentially displaces an amount of material of the conductive body 332 toward the longitudinal axis of the center conductor 330. The crimped region 350 defines a contact member 348 formed by the lancing operation. Similar to the previous embodiment, the contact member 348 is formed only in a first body half 340 (FIG. 18) of a conductive body 332.

Figure 12:
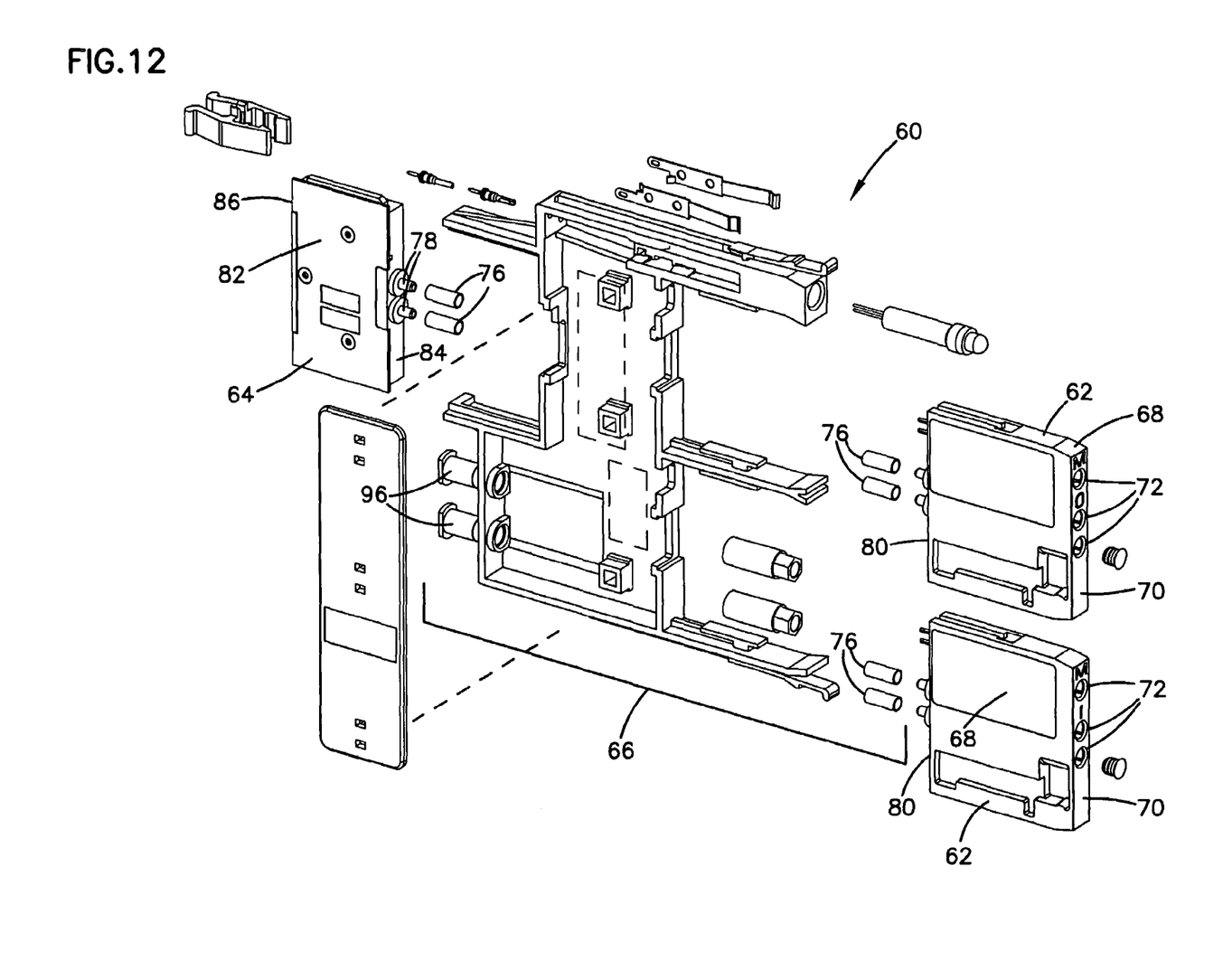
FIG. 12 is an exploded view of one embodiment of a coax jack module assembly having center conductors in accordance with the principles disclosed.

Referring now to FIG. 12, the center conductors of the present disclosure can be used in a variety of applications, including a coax jack module assembly 60. The illustrated coax jack module assembly 60 includes at least one front module component 62 (two are shown) and a rear module component 64. The front and rear module components 62, 64 are interconnect to one another by an intermediate connection module 66 having intermediate coaxial cables 76 (shown in part adjacent to each of the front and rear module components 62, 64). The front and rear module components 62, 64 and the intermediate connection module 66 can be configured such that the coax jack module assembly 60 provides cross-connect functions, line monitoring, and line access of high speed signals, as desired.

Figure 13:
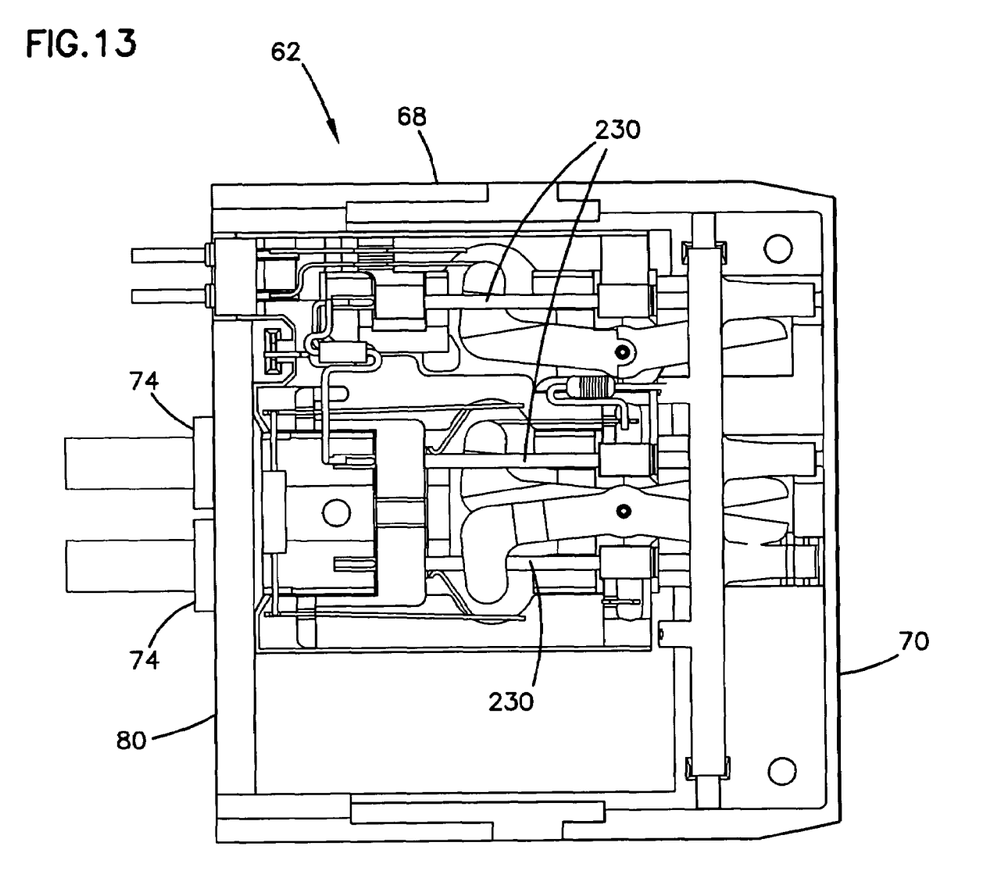
FIG. 13 is a side elevation view of one embodiment a front module component of the coax jack module assembly of FIG. 12, having center conductors as shown in FIG. 10.
Figure 14:
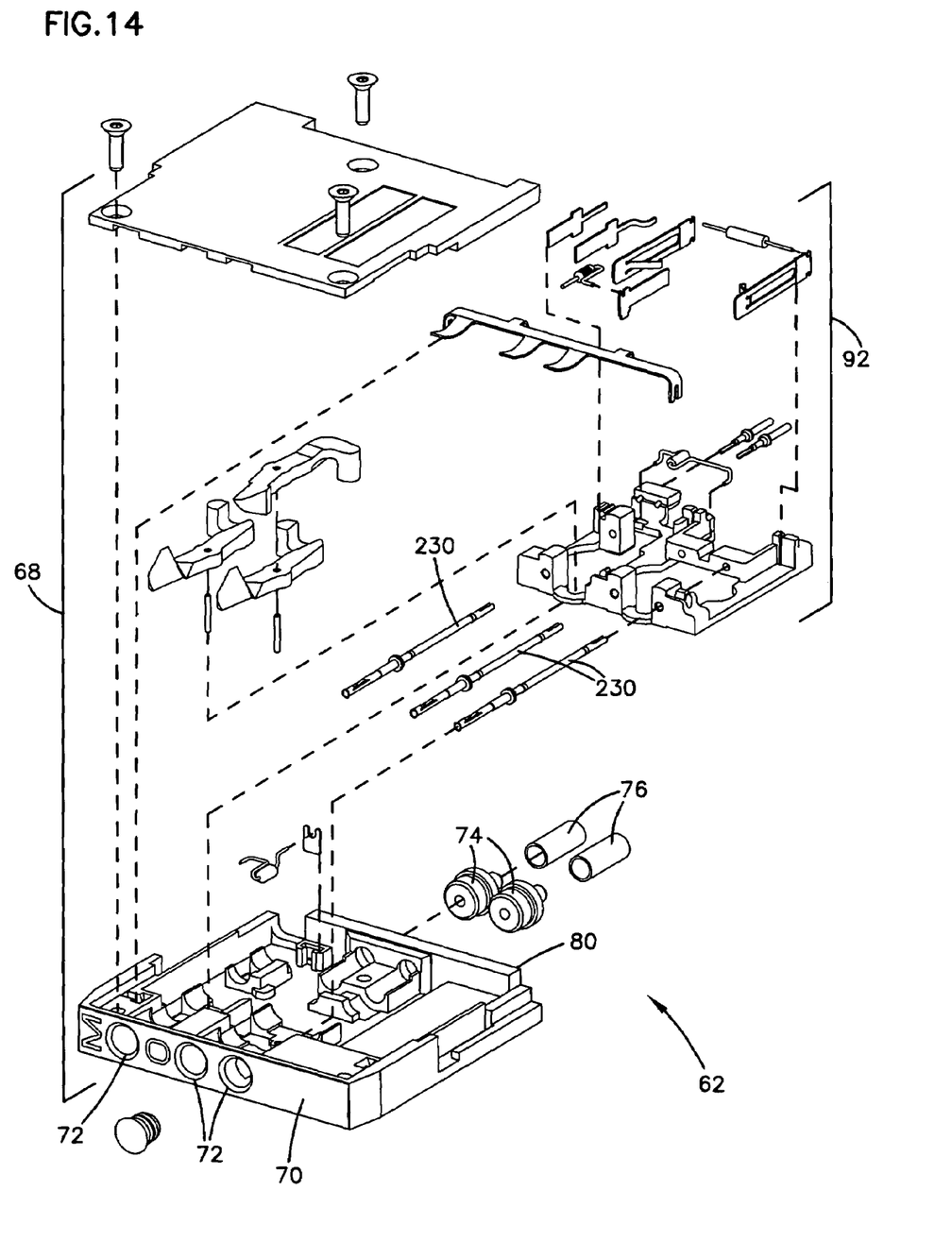
FIG. 14 is an exploded view of the front module component of FIG. 13.

Referring now to FIGS. 12-14, the front module component 62 of the coax jack module assembly 60 includes a housing 68 that carries a number of switching assemblies 92 (FIG. 14). The housing 68 has a front 70 and a rear 80. The front 70 of the housing defines ports 72. Jack plugs are inserted within the ports 72 such that the pin elements (e.g. 14 in FIG. 3) of the jack plugs 12 are received within the center conductors 230 (FIG. 13) of the front module component 62. As shown in FIG. 14, the front module component 62 includes three center conductors 230, each associated with a switching assembly and each located within a port 72 of the housing 68. The center conductors 230 used in the illustrated front module component 62 are similar to those shown in FIGS. 10 and 11. The center conductors 230 interconnect to coaxial connectors 74 located at the rear 80 of the housing 68. The coaxial connectors 74 are in turn are coupled to the intermediate coaxial cables 76 of the intermediate connection module 66 (FIG. 12).

Referring back to FIG. 12, the intermediate coaxial cables 76 of the intermediate connection module 66 at least partially interconnect the front module component 62 and the rear module component 64. In particular, the intermediate coaxial cables 76 of the intermediate connection module 66 provide an interconnection between the coaxial connectors 76 of the front module component 62 and coaxial connectors 78 of the rear module component 64. The intermediate connection module 66 also includes coaxial connectors 96 that interconnect to the pieces of equipment. The coaxial connectors 96 also preferably include center conductors in accordance with the principles disclosed.

Figure 15:
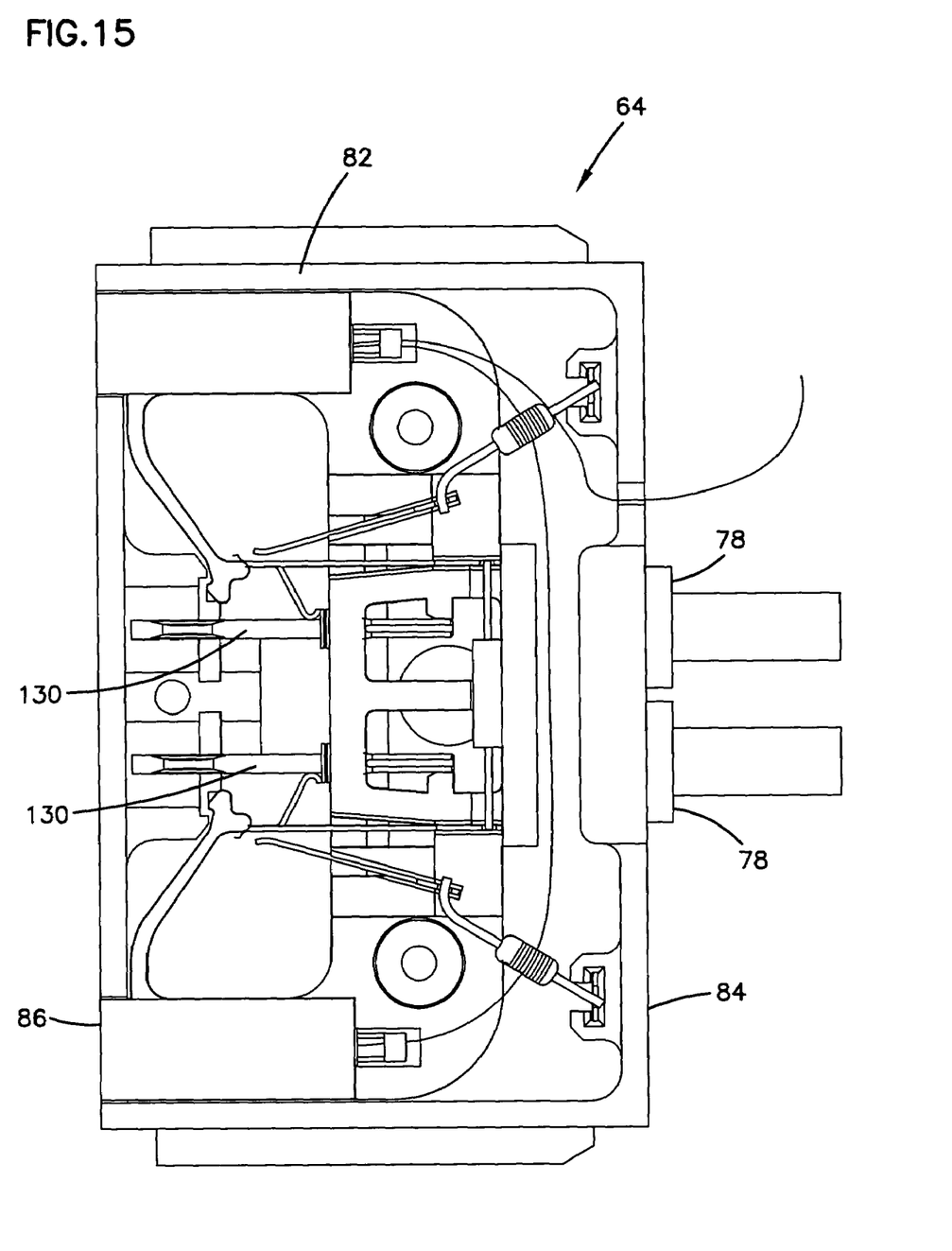
FIG. 15 is a side elevation view of one embodiment a rear module component of the coax jack module assembly of FIG. 12, having center conductors as shown in FIG. 9.
Figure 16:
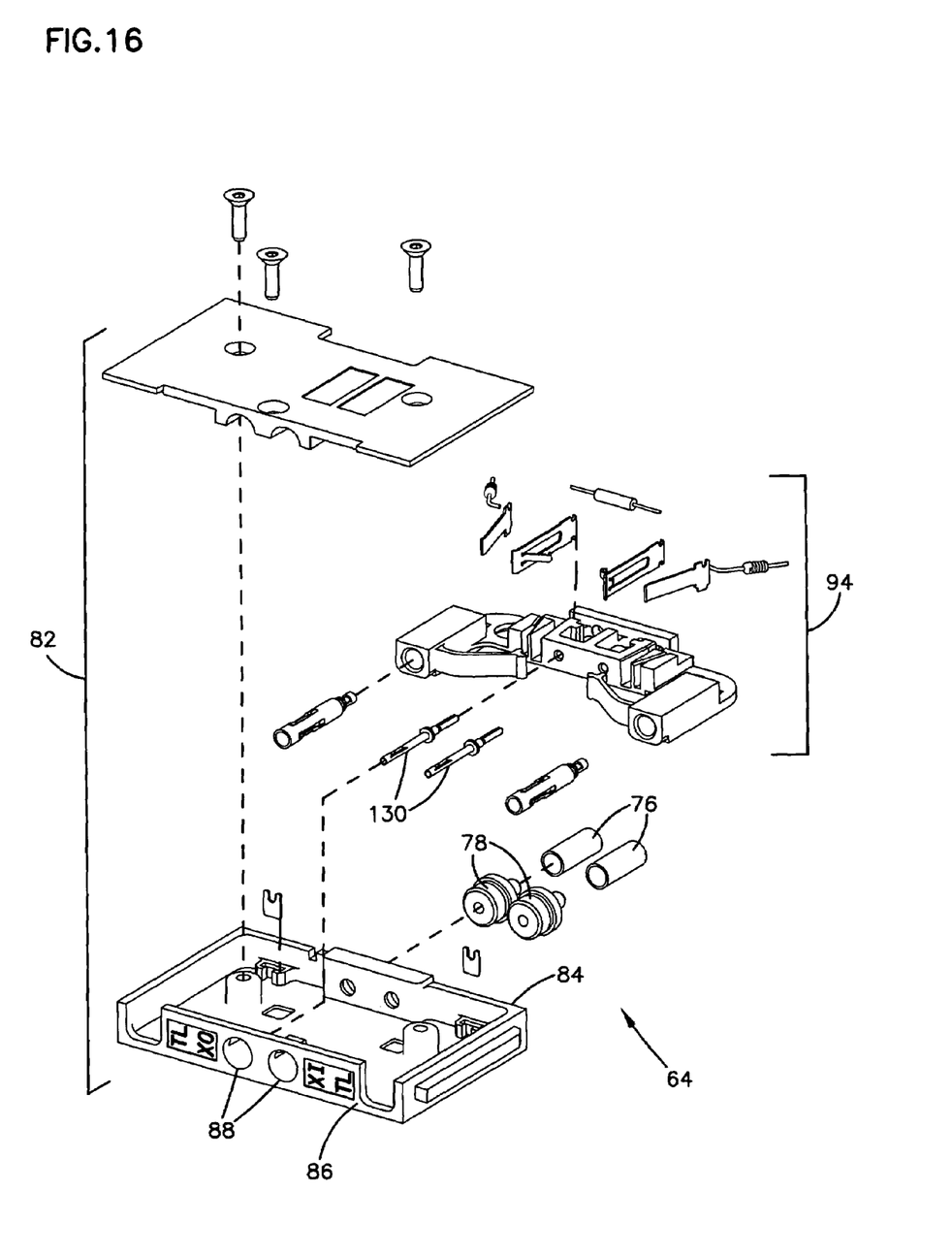
FIG. 16 is an exploded view of the rear module component of FIG. 15.

Referring now to FIGS. 12 and 15-16, the rear module component 64 also includes a housing 82 that carries a number of switching assemblies 94 (FIG. 16). The housing has a front 84 and a rear 86. The coaxial connectors 78 are located at the front 84 of the housing 82 of the rear module component 64. The rear 86 of the housing 82 defines ports 88 (FIG. 16). Jack plugs are inserted within the ports 88 such that the pin elements (e.g. 14 in FIG. 3) of the jack plugs 12 are received within center conductors 130 of the rear module component 64. As shown in FIG. 16, the rear module component 64 includes two center conductors 130, each associated with a switching assembly and each located within a port 88 of the housing 82. The center conductors 130 used in the illustrated rear module component 64 are similar to those shown in FIG. 9. The center conductors 230 interconnect to coaxial connectors 78 located at the front 84 of the housing 82.

The front and rear module components 62, 64 can be used in a number of a coax jack module assembly configurations. For example, the coax jack module assembly 60 of FIG. 12 is configured to function as a 4-port module assembly. A 4-port module assembly provides direct monitoring access to incoming and outgoing signals. The front and rear module components 62, 64 can be used in other types or differently configured coax jack modules assemblies, such as a 6-port module assembly, or an interconnect module assembly, and further, a looping module assembly, a non-looping module assembly, or a 75-ohm auto-termination module assembly, for example. A 6-port module assembly provides the direct monitoring of signals as provided in the 4-port module, and also provides monitoring of auxiliary incoming cross-connect signals and auxiliary outgoing cross-connect signals. An interconnect module assembly is used to directly interconnect two pieces of equipment, as opposed to using more than one module component for cross-connection between the two pieces of equipment. The various looping, non-looping and termination configurations relate to options concerning the disposition of alarm signals generated by, and associated feedback to, the pieces of equipment.

As can be understood, telecommunication systems are often adapted to accommodate fast-changing network connections. Adapting, monitoring, and testing the connections requires a technician to insert and remove jack plugs from the various front and rear modules a repeated number of times. Preferably, each of the front and rear modules (e.g., 62, 64) of the coax jack module assembly 60 includes a center conductor having a crimped region, as described herein. The disclosed crimped region of the center conductor embodiments improve the structural reliability and life cycle of the center conductor, as compared to conventional center conductor arrangements that experienced problematic mechanical failure and premature fatigue.

The above specification provides a complete description of the present invention. Since many embodiments of the invention can be made without departing from the spirit and scope of the invention, certain aspects of the invention reside in the claims hereinafter appended.

What is claimed is:

1. A center conductor, comprising:
  a) a conductive body defining an inner diameter and having a longitudinal axis, the longitudinal axis defining a plane that bisects the conductive body, the plane defining a first body half and a second body half; and
  b) a crimped region located in only one of the first body half and the second body half, the crimped region including a contact member defined by elongated slots formed in the conductive body, the contact member having a portion that projects into the inner diameter toward the longitudinal axis of the conductive body;
  c) wherein the elongated slots are formed in the conductive body by cuts made at an angle parallel to the plane that bisects the conductive body.

2. The center conductor of claim 1, wherein the elongated slots are saw cuts.

3. The center conductor of claim 1, wherein the elongated slots are formed in the conductive body at a distance from the plane that bisects the conductive body.

4. The center conductor of claim 1, wherein the contact member includes a central portion and first and second ends, the first and second ends being wider than the central portion.

5. The center conductor of claim 1, wherein the contact member has first and second ends that taper toward a central portion.

6. The center conductor of claim 5, wherein each of the first and second ends of the contact member is integrally connected to the conductive body.

7. The center conductor of claim 1, wherein the crimped region is located about a portion of a circumference of the conductive body, a remaining portion of the circumference defining an uninterrupted region.

8. The center conductor of claim 7, wherein the uninterrupted region is approximately 75% of the circumference of the conductive body.

9. The center conductor of claim 1, wherein the inner diameter of the conductive body is defined by a tubular construction provided only at a first end of the conductive body, the inner diameter of the tubular construction being approximately 0.032 inches.

10. A module component for use in a coax jack module assembly, the module component including:
   a) a housing defining a port, the port being sized for receipt of a jack plug; and
   b) a center conductor located within the housing adjacent to the port, the center conductor including;
      i) a conductive body having a central axis, the central axis defining a plane that bisects the conductive body into a first body half and a second body half; and
      ii) a crimped contact member formed in only one of the first body half and the second body half of the conductive body, the crimped contact member being defined by elongated slots, the elongated slots being formed in the conductive body by cuts made at an angle parallel to the plane that bisects the conductive body, the crimped contact member projecting toward the central axis of the center conductor.

11. The module component of claim 10, wherein the crimped contact member includes first and second ends that taper toward a central portion.

12. The module component of claim 10, wherein the elongated slots are formed in the conductive body at a distance from the plane that bisects the conductive body.

13. The module component of claim 10, wherein the crimped contact member is located at a crimped region of the center conductor, the crimped region being located about a portion of a circumference of the conductive body, a remaining portion of the circumference defining an uninterrupted region.

14. The module component of claim 10, wherein the housing has a front and a rear, the port being located at the front of the housing.

15. The module component of claim 10, wherein the housing has a front and a rear, the port being located at the rear of the housing.

16. The module component of claim 10, wherein the port is located at one of a front and a rear of the housing, the other of the front and the rear of the housing having a coaxial connector.

17. A method of manufacturing a center conductor, the method comprising the steps of:
   a) providing a conductive body having a tubular construction, the conductive body defining a longitudinal axis, the longitudinal axis defining a plane that bisects the body into a first half and a second half;
   b) angling a saw blade parallel to the plane and cutting first and second slots within the tubular construction of the first half of the conductive body with the angled saw blade; and
   c) crimping a contact portion of the conductive body, the contact portion being located between the first and second slots of the first half of the conductive body.

18. The method of claim 17, wherein the step of crimping the contact portion includes crimping only the contact portion, the contact portion being located along a portion of a circumference of the conductive body, a remaining portion of the circumference defining an uninterrupted region.

19. The method of claim 18, wherein the step of crimping only the contact portion includes providing an uninterrupted region of approximately 75% of the circumference of the conductive body.

20. The method of claim 17, wherein the step of cutting the first and second slots includes forming the contact portion with first and second ends that taper toward a center region.

21. The method of claim 20, wherein the step of forming the contact portion includes forming the contact portion with first and second ends integrally connected to the conductive body.

22. The method of claim 17, wherein the step of providing the conductive body includes providing the conductive body having an inner diameter at a first end of the conductive body, the inner diameter being approximately 0.032 inches.

23. A center conductor, comprising:
   a) a conductive body defined by a tubular construction having a longitudinal axis, the longitudinal axis of the tubular construction defining a plane that bisects the conductive body, the plane defining a first body half and a second body half; and
   b) a crimped region located in only one of the first body half and the second body half, the crimped region including a contact member defined by elongated slots extending parallel with the longitudinal axis of the tubular construction, each of the elongated slots defining slot surfaces that extend through the tubular construction of the conductive body, one of the slot surfaces being parallel to the plane that bisect the body, the contact member having a portion that projects into the tubular construction toward the longitudinal axis.

24. The center conductor of claim 23, wherein the contact member has an hourglass shape.

25. The center conductor of claim 23, wherein the elongated slots are saw cuts, each of the saw cuts being provided in the tubular construction of the conductive body at an angle parallel to the plane that bisects the conductive body.

26. The center conductor of claim 23, wherein the elongated slots are formed in the conductive body at a distance from the plane that bisects the conductive body.

27. The center conductor of claim 23, wherein the contact member includes a central portion and first and second ends, the first and second ends being wider than the central portion.

28. The center conductor of claim 23, wherein the contact member has first and second ends that taper toward a central portion.

29. The center conductor of claim 28, wherein each of the first and second ends of the contact member is integrally connected to the conductive body.

30. The center conductor of claim 23, wherein the crimped region is located about a portion of a circumference of the conductive body, a remaining portion of the circumference defining and uninterrupted region.

31. The center conductor of claim 30, wherein the uninterrupted region is approximately 75% of the circumference of the conductive body.

32. The center conductor of claim 23, wherein the tubular construction defines an inner diameter, the inner diameter being approximately 0.032 inches.

* * * * *